3,544,381
Patented Dec. 1, 1970

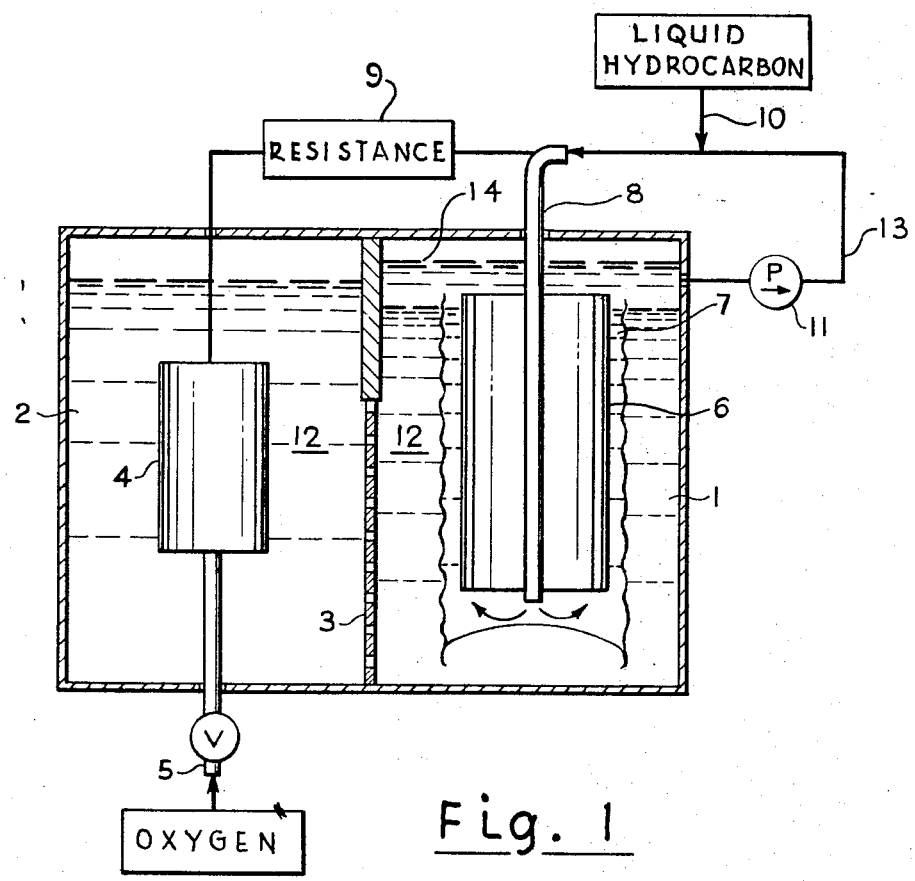
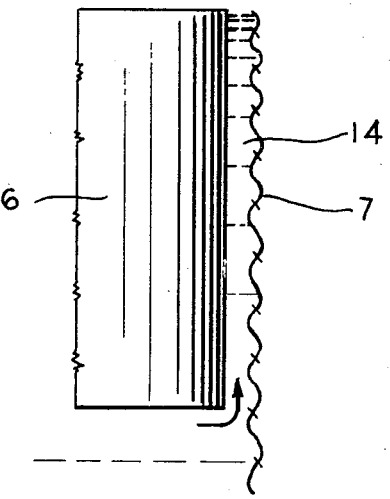
Fig. 1
Fig. 2

3,544,381
FUEL CELL WITH WICKING-TYPE ELECTRODE
George T. Miller, Lewiston, N.Y., assignor to Hooker Chemical Corporation, Niagara Falls, N.Y., a corporation of New York
Continuation-in-part of application Ser. No. 622,959, Mar. 14, 1967. This application Oct. 5, 1967, Ser. No. 673,202
Int. Cl. H01m 27/04
U.S. Cl. 136—86       4 Claims

ABSTRACT OF THE DISCLOSURE

A fuel cell with wicking type fuel electrode is provided by wrapping or pressing an electrically conductive base or support with a porous, hydrophobic sheet of fiber or paper upon which a catalyst is deposited. A liquid fuel, substantially insoluble in the electrolyte wicks up between the electrode base and the hydrophobic porous sheet of material to contact the catalyst at the electrolyte, catalyst, fuel interface, generating electrical current.

RELATED APPLICATIONS

This application is a continuation-in-part of my copending application Ser. No. 622,959 filed Mar. 14, 1967 for Fuel Cell Electrode and Process.

BACKGROUND OF THE INVENTION

Wicking type electrodes for use in fuel cells are disclosed in my copending application Ser. No. 622,959, filed Mar. 14, 1967, and in copending application Ser. No. 673,105 by G. T. Miller and A. N. Dey, filed Oct. 5, 1967.

Fuel cells are systems or apparatus designed to produce electrical energy by consumption of chemical energy resulting from the oxidation of materials such as hydrogen, carbon monoxide, alcohols, hydrocarbons or the like. Preferably such cells are adapted for continuous operation by feeding a fuel and an oxidant continuously into the cell to the fuel electrode and oxidizer electrode, respectively. Preferred oxidants are oxygen, or an oxygen containing gas such as air. When the fuel or oxidizible material is a gas such as hydrogen or a low molecular weight hydrocarbon, it is fed into the cell by way of a porous electrode, through which the gaseous material passes into contact with the electrolyte. The fuel electrode is commonly provided with a catalytic material such as platinum on the surface of the electrode exposed to the electrolyte whereby the fuel gas fed into the porous electrode contacts both the catalyst and the electrolyte.

Heretofore, fuels utilized in fuel cells have been chiefly hydrogen, gaseous hydrocarbons or other carbonaceous gases, or water soluble materials such as methanol and ethanol. The use of gaseous fuels requires the employment of porous electrodes which have a number of disadvantages. In addition, for many uses of fuel cells, small portable cells are most desirable which are readily transportable to remote areas where electric energy is not available. For such purposes, a fuel which is readily stored and handled and is readily available at such locations is highly desirable. Liquid hydrocarbon fuels are ideal under these circumstances. Thus, any expedition proceeding to localities where electric energy is not available would generally carry liquid hydrocarbon fuel for their means of transportation. This same fuel may be used for operating the fuel cells of this invention.

In operating a fuel cell with a porous fuel electrode, care must be taken to prevent flooding of the sites of catalytic activity by the electrolyte which would prevent contact between the fuel and catalyst. Likewise, when a liquid fuel is used there is a tendency to flood the catalyst sites with the liquid fuel. In addition, liquid hydrocarbon fuels tend to plug the pores of a porous electrode with polymerization products.

SUMMARY OF THE INVENTION

The object of this invention is a fuel cell which operates on a liquid fuel. A further object is to provide an improved means for bringing a liquid fuel into contact with the electrolyte and the catalyst on a fuel cell electrode. Another object is to bring the liquid fuel into contact with the electrolyte and catalyst over an extended area of the electrode. Other objects are apparent from the following detailed description of the invention.

In accordance with this invention I provide a fuel cell having an oxidizable liquid material as fuel and cause the liquid fuel to pass in a thin layer or film between the contiguous surfaces of an electrically conductive, solid electrode and a sheet of porous hydrophobic fibrous paper or cloth in contact with the solid electrode. Said paper or cloth, containing impregnated therein a catalytic material such as a noble metal or preferably platinum or platinum black, is attached to the electrically conductive electrode base in any suitable manner such as by tying with an inert fiber, cord or wire or by pressure of an inert screen or the like.

The liquid fuel may be disposed above or below the fuel electrode, depending upon the specific gravity of the fuel. Where the fuel is heavier than the electrolyte, it will wick up the electrode from its bottom reservoir. Where the fuel is lighter than the electrolyte, it will form a floating reservoir in the fuel electrode compartment, from which it will wick down the electrode or preferably be pumped to the base of the electrode from where it will wick upward. The liquid fuel fills the voids between the paper or cloth and the electrically conducting electrode base. The fuel passes through the porous hydrophobic cloth or paper to contact the catalyst and electrolyte simultaneously.

BRIEF DESCRIPTION OF THE DRAWINGS

FIG. 1 is a diagrammatic illustration of a fuel cell which embodies the present invention.

FIG. 2 is a magnified presentation of the fuel electrode of the invention.

DESCRIPTION OF PREFERRED EMBODIMENTS

The fuel cell illustrated by FIG. 1 is provided with fuel electrode compartment 1 and oxidizer electrode compartment 2 which are separated by porous diaphragm 3. Compartment 2 is provided with a conventional oxidizer electrode 4 fed with oxygen or air through inlet pipe 5. Compartment 1 is provided with fuel electrode 6 which may be made of any electroconductive material having tightly wrapped around it or pressed against it, a porous, hydrophobic sheet 7 upon which a catalyst such as platinum or platinum black is deposited. Fuel electrode 6 is provided with a pipe 8, passing through the length of the electrode. Pipe 8 also functions as the lead for connecting the electrode to resistance 9 to which electrode 4 is electrically connected. Resistance 9, of course, represents any means for utilizing the electrical power generated by the cell whether by transference into heat, mechanical motion or other forms of energy. Pipes 10 and 13 and associated pumped 11 serve to flow liquid fuel into pipe 8 from the liquid fuel reservoir and from unresetted fuel 14 floating on electrolyte 12.

Electrode 6 and its covering 7 serve to wick the fuel 14 upward so as to fill the interstices between their surfaces. The fuel penetrates the porous, hydrophobic sheet contacting simultaneously the catalyst on the surface of 7 and the electrolyte 12. The electrolyte 12 is any conventional liquid electrolyte, for example sulfuric or phosphoric acid. The liquid fuel pumped through pipe 8 forms a pool at the base of the electrode. The fuel forms a meniscus at the base of the electrode through its preferential wetting action of the porous, hydrophobic sheet.

While an important object of this invention is to provide a means for utilizing liquid hydrocarbons as fuels in fuel cells, the invention is not restricted thereto and it is applicable to employment of any liquid fuel in a fuel cell. Practically any organic liquid may be utilized, except that liquids such as lower molecular weight alcohols which are readily soluble in the electrolyte are not within the scope of this invention, because they react from solution, whereas my invention comprises reacting a film of liquid fuel on the surface of the electrode in contact with the electrolyte as a separate phase. However, the the presence of oxidable material soluble in the electrolyte in the liquid fuel compartment is not deleterious to the practice of my invention and therefore is included. In addition to liquid hydrocarbons, whether aliphatic or aromatic, I may use nitriles, esters, high molecular weight alcohols and ketones, azo compounds, liquid aromatic acids and other carboxylic compounds. Solutions of solid carbon-containing compounds, such as high molecular weight fatty acids, naphthalene and the like may be utilized by dissolving them in liquid hydrocarbons or other liquid fuel and feeding the solutions to my improved electrode. Likewise, gaseous hydrocarbons or other oxidizable gases dissolved in liquid hydrocarbon may be employed as the liquid fuel. The solvents thus used need not function as fuels, but they may be only partly or substantially completely resistant to oxidation in the fuel cell and function mainly to transport the oxidizable material to the sites of reaction. Solvents thus resistant to oxidation include silicone oils and various halogenated hydrocarbons such as carbon tetrachloride, chloroethylenes and the fluoroethylenes. One function of such solvent is to modify the specific gravity of the fuel stream; for example, the solution may be made heavier than the aqueous electrolyte. It is to be understood that the term "liquid fuel" includes all fuel materials which are liquid at the temperature of the electrolyte in contact with the fuel electrode.

The invention further is not restricted to carbonaceous liquid fuels but any oxidizable liquid material for example, molten phosphorus or molten sulfur, may be used. Thus, in the employment of molten phosphorus, utilizing phosphoric acid as the electrolyte, the phosphorus is oxidized to form phosphoric acid while simultaneolsly producing an electric current, thereby decreasing the cost of production of the oxidation product. Similarly, sulfur may be converted to sulfurous and sulfuric acids and simultaneous production of electric current.

The electro-conductive material which the porous, hydrophobic sheet contacts may be made of graphite, carbon or any metal which is compatible with the electrolyte employed such as steel, brass, copper, lead, tin and various alloys of these metals. If desired, organic plastic materials which have been rendered electro-conductive by coatings of metals or other conductors or by impregnation with conductive metal or carbon powders may be used. Either a porous or non-porous electro-conductive material may be used as the support for the porous, hydrophobic sheet.

The function of the diaphragm in a fuel cell is to prevent the fuel from contacting the oxidizing electrode and to keep the oxidizing material from the fuel electrode. Any of the conventional devices serving this function may be employed, whether semi-permeable diaphragms or merely partitions or submerged weirs.

Example 1

A fuel electrode was prepared by wrapping a sheet of platinum treated acrylic fiber paper around a graphite rod and tying it securely with a "Teflon" fiber. The electrical resistance due to poor contact of the paper and the graphite is appreciable. However, the wicking action was acceptable. The surface area of the paper electrode was 10–12 cm.$^2$.

The electrode so prepared was wetted by soaking it in octane and then it was placed in a fuel cell constructed from glass in the form of an H and separated into the two electrode compartments by a fritted glass diaphragm in the horizontal section. The oxidizer electrode consisted of a cylinder of platinum screen and oxygen was introduced below the electrode. The electrolyte was 10% by volume $H_3PO_4$ and the fuel was octane. The fuel cell was operated at a temperature of about 100° C. and produced the following results.

FUEL CELL CONDITION

Open circuit potential difference=0.81 volt.

| Current-milliamperes: | Volts |
|---|---|
| 0.1 | 0.77 |
| 0.3 | 0.72 |
| 1.0 | 0.60 |
| 2.0 | 0.48 |
| 3.0 | 0.40 |
| 5.9 | 0.23 |
| 10.0 | 0.06 |

Example 2

Example 1 was repeated under the same conditions with the sole distinction that the paper electrode was not originally soaked in octane, providing the following results:

FUEL CELL CONDITION

Open circuit potential difference=0.78 volt.

| Current-milliamperes: | Volts |
|---|---|
| 0.1 | 0.76 |
| 0.3 | 0.72 |
| 1.0 | 0.60 |
| 2.1 | 0.51 |
| 3.0 | 0.44 |
| 5.3 | 0.23 |
| 9.0 | 0.03 |

Example 3

A paper electrode made in the manner set forth in Example 1 was platinized electrochemically from chloroplatinic acid solution in order to increase the electrical conductivity of the paper electrode.

The electrode so prepared was placed in the fuel cell described in Example 1.

FUEL CELL CONDITION

Open circuit potential difference=0.80 volt.

| Current-milliamperes: | Volts |
|---|---|
| 0.1 | 0.79 |
| 0.3 | 0.75 |
| 1.0 | 0.66 |
| 3.0 | 0.50 |
| 6.0 | 0.35 |

Example 4

Example 3 was repeated under identical conditions with the sole exception that 20% by volume $H_3PO_4$ was employed as the electrolyte, with the following results:

FUEL CELL CONDITION

Open circuit potential difference=0.76 volt.

| Current-milliamperes: | Volts |
|---|---|
| 0.1 | 0.75 |
| 0.3 | 0.71 |
| 1.0 | 0.64 |
| 3.0 | 0.54 |
| 6.0 | 0.40 |
| 10.0 | 0.15 decreasing |

Example 5

Example 3 was repeated. One square centimeter of electrode area was exposed to the electrolyte.

The voltage at 1 milliampere current is 0.60 which drops to 0.52 after 30 minutes. The current was then dropped to 0.29 milliampere for 5 minutes. By increasing the current to 1 milliampere again the voltage increased to 0.56.

To study the effect of surface active agents on the paper electrode of this invention, the following experiments were conducted.

Example 6

A fuel electrode prepared as in Example 3 was placed in the fuel cell operating on octane, 10% by volume $H_3PO_4$ at about 100° C.

FUEL CELL CONDITION

Open circuit potential difference = 0.73 volt.

| Current-milliamperes: | Volts |
|---|---|
| 0.1 | 0.70 |
| 0.3 | 0.62 |
| 1.0 | 0.50 |
| 3.0 | 0.34 decreasing to 0.28 |
| 6.2 | 0.09 |

On opening the circuit, the potential difference was 0.72 volt. Sodium xylene sulfonate (0.43 gm.) was added and the open circuit potential difference rose to 0.79 volt.

FUEL CELL CONDITION

| Current-milliamperes: | Volts |
|---|---|
| 0.1 | 0.74 |
| 0.3 | 0.66 |
| 1.0 | 0.53 |
| 2.6 | 0.34 |
| 3.0 | 0.30 |
| 4.9 | 0.09 |

To study the function of the electrolyte, the following experiments were conducted.

Example 7

A paper electrode was prepared as described in Example 3. It had a platinized surface area of 10 square centimeters. Rather than employing $H_3PO_4$ solely as the electrolyte, a mixture of 10% by volume $H_3PO_4$ and 10% by volume HCl were employed in 1:1 proportion with octane fuel at a temperature of about 100° C.

FUEL CELL CONDITION

Rest potential of the paper electrode vs. a saturated Calomel electrode = 0.47 volt.

Rest potential of the $O_2$ electrode vs. a saturated Calomel electrode = 0.56 volt.

Open circuit potential difference after cathodic pulse on the paper electrode = 0.16 volt.

| Current-milliamperes: | Volts |
|---|---|
| 0.1 | 0.15 |
| 0.3 | 0.13 |
| 1.0 | 0.08 |

Example 8

A paper electrode was produced as disclosed in Example 3. It had a surface area of 10 square centimeters. On octane fuel at about 100° C. in 10% by volume $H_2SO_4$ fuel cell data was collected as follows:

FUEL CELL CONDITION

Open circuit potential difference = 0.77 volt.

| Current-milliamperes: | Volts |
|---|---|
| 0.1 | 0.71 |
| 0.3 | 0.65 |
| 1.0 | 0.57 |
| 3.0 | 0.45 |
| 10.0 | 0.30 decreasing to 0.21 |

By adding equal volumes of 10% by volume $H_2SO_4$ to the system just described, the open circuit potential dropped from 0.77 volt to 0.62 volt.

I claim:

1. A fuel cell comprising in combination a casing divided by a diaphragm into compartments housing respectively an oxidizer electrode and a fuel electrode, means for supplying an oxidant to the oxidizer electrode, means for supplying fuel to the fuel electrode compartment, an electrolyte in each electrode compartment, said fuel electrode being adapted for consumption of liquid fuel and comprising a porous, hydrophobic sheet of polymeric material upon which a catalyst is disposed, said sheet being non-adhesively secured to an electroconductive base to form a contiguous surface, said fuel electrode being so constructed and united that said liquid fuel wicks between the surface of said electroconductive base and said porous, hydrophobic sheet of polymeric material and passes through said porous, hydrophobic sheet into contact with said catalyst and said electrolyte.

2. The fuel cell of claim 1 in which the catalyst deposited on the porous, hydrophobic sheet of polymeric material is platinum black.

3. The fuel cell of claim 1 in which the electroconductive base is a graphite rod.

4. The fuel cell of claim 1 in which the polymeric material is an acrylic fiber.

References Cited

UNITED STATES PATENTS

| | | | |
|---|---|---|---|
| 3,348,974 | 10/1967 | Barber et al. | 136—86 |
| 3,355,326 | 11/1967 | Semones et al. | 136—120 X |
| 3,386,859 | 6/1968 | Biddick | 136—120 |
| 3,411,954 | 11/1968 | Richman | 136—120 |
| 3,413,239 | 11/1968 | Olstowski et al. | 136—121 |
| 3,423,246 | 1/1969 | Prager et al. | 136—120 |

FOREIGN PATENTS

| | | |
|---|---|---|
| 1,477,949 | 6/1966 | France. |
| 981,868 | 1/1965 | Great Britain. |
| 970,418 | 9/1964 | Great Britain. |

ALLEN B. CURTIS, Primary Examiner

U.S. Cl. X.R.

136—120